United States Patent [19]

Blakesley

[11] Patent Number: 4,575,285

[45] Date of Patent: Mar. 11, 1986

[54] CUTTING TOOL AND METHOD OF MANUFACTURE

[75] Inventor: Richard C. Blakesley, Holcomb, N.Y.

[73] Assignee: The Gleason Works, Rochester, N.Y.

[21] Appl. No.: 672,532

[22] Filed: Nov. 19, 1984

[51] Int. Cl.[4] .......................... B26D 1/00; B21K 5/12
[52] U.S. Cl. .................................. 407/115; 407/22; 76/101 A
[58] Field of Search .................. 407/115, 21, 22; 76/101 R, 101 A

[56] References Cited

U.S. PATENT DOCUMENTS

| | | | |
|---|---|---|---|
| 3,882,579 | 5/1975 | Peacock | 76/101 A |
| 4,260,299 | 4/1981 | Ryan et al. | 407/115 |
| 4,278,370 | 7/1981 | Spear | 407/115 |
| 4,530,623 | 7/1985 | Kotthaus | 407/22 |

FOREIGN PATENT DOCUMENTS 0085176  8/1983  European Pat. Off. .
386916  12/1923  Fed. Rep. of Germany ........ 407/21

Primary Examiner—Leonidas Vlachos
Attorney, Agent, or Firm—Ralph E. Harper; Morton A. Polster; Thomas B. Ryan

[57] ABSTRACT

An improved cutting tool intended primarily for gear cutting operations and a method of manufacturing this new tool. The tool is of a type formed from a length of bar stock and may be resharpened while preserving metallurgical or other treatments on front cutting faces of the tool. The improved tool also includes a base mounting portion and a cutting end. A first cutting face is formed in part of the length of the tool and a second cutting face is formed throughout substantially the full length of the tool in a way that preserves important mounting surfaces in the base portion of the tool.

14 Claims, 8 Drawing Figures

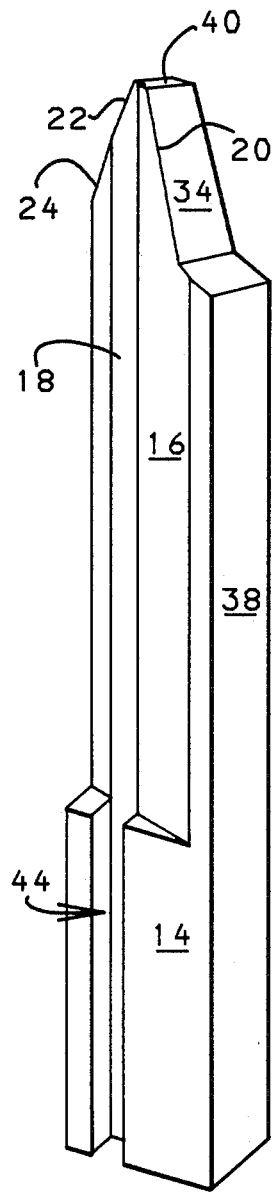
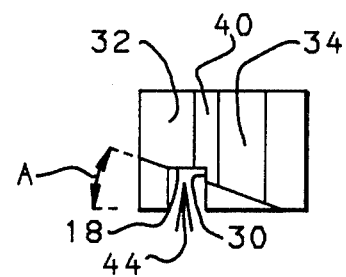
FIG. 4
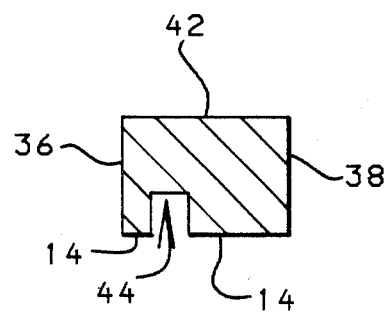
FIG. 5
FIG. 3

CUTTING TOOL AND METHOD OF MANUFACTURE

BACKGROUND OF INVENTION

The invention relates to improvements in cutting tools useful for cutting slots in work pieces and is more particularly concerned with improved cutting tools for gear cutting operations.

It is known in the art of gear cutting to provide for cutting tools formed from lengths of bar stock which can be easily resharpened by their users by simply re-grinding top and flank surfaces on a profiled cutting end of each tool. The cutting face of such a tool does not require resharpening, and this permits a preservation of the cutting face for metallurgical or other types of treatments which improve cutting and wear characteristics of the tool. In addition, it is known to provide compound front cutting faces on such tools which extend parallel to the tool axis and which may be either angularly related or offset with respect to each other. Cutting faces may extend either the full length of the tool or part of that length. In the latter instance, the tool may include a rectangular cross-section in its base portion, and this provides for better mounting and increased rigidity of the tool when mounted in a cutter head.

Typically, gear cutting tools are arranged in groups about a cutter head. Each group may include separately designed cutting tools for separately cutting the two side walls and the bottom portion of each tooth slot to be formed in a work piece. For instance, an inside cutting tool may be provided to cut one side wall of a tooth slot, an outside cutting tool may be provided to cut the opposite side wall of the same tooth slot, and a bottom cutting tool may be provided for forming the bottom of the tooth slot in the work piece. The bottom cutting tool, however, may be eliminated if inside and outside cutting tools are appropriately designed with compound front cutting faces for cutting portions of the bottom of a tooth slot. By providing inside and outside tools with compound cutting faces in lieu of bottom cutting tools, associated second top and flank surfaces on these tools may be more effectively utilized. Normally, second top and flank surfaces are provided only for cutting clearance purposes. However, cutting tools with compound cutting faces may be designed so that second top and flank surfaces on these tools perform a rough cutting function. More particularly, inside and outside cutting tools with compound cutting faces may be designed so that each tool finish cuts one side wall and a portion of the bottom of a tooth slot as well as rough cuts the opposite side wall and remaining bottom portion of the same tooth slot. In this way a greater number of tools can be provided in a given cutter head for working the side walls of the tooth slots being formed and this provides for faster completing operations in which tooth slots are formed in a single set up between tooling and work piece. Also, in certain gear cutting operations such as continuous index cutting, it is especially difficult to accurately position bottom cutting tools, and thus, their elimination greatly simplifies the design and set up of this type of cutter assembly.

Gear cutting tools generally consist of hardened tool steel with front cutting faces ground into the tool steel with a rotary disk shaped grinding wheel. For forming a first cutting face in a length of bar stock, a disk shaped grinding wheel may be adapted to traverse across the bar stock with respect to its lengthwise direction. In this way a first cutting face may be formed in part of the length of the bar stock while maintaining a base portion of rectangular cross section in the remaining length of the bar stock. The base portion includes rectangular mounting surfaces which are useful for locating the tool during subsequent formation of the cutting end of the tool and for rigidly mounting the tool within a cutter head during use. Preferably, an abrupt junction is formed between the first cutting face and base portion of the tool so that the useful lengths of both the cutting face and base portion may be maximized. For forming offset or certain angularly related second front cutting faces, a disk shaped grinding wheel must traverse along the length of the bar stock instead of across the same length to prevent removal of the first formed cutting face. Lengthwise grinding of the second cutting face, however, prevents formation of an abrupt junction between the cutting face and the base portion of the tool. Typically, either an impression of the circumference of a disk shaped grinding wheel is formed in the region of this junction or a section of the base portion of the tool which is aligned lengthwise with the second cutting face is removed altogether. In either case, a critical corner defined between rectangular mounting surfaces at the junction of the base portion with the second cutting face may be undesirably removed. Effective use of the base portion to accurately retain the tool during subsequent manufacture and use is thereby diminished.

SUMMARY OF THE INVENTION

The present invention obviates this problem by providing a novel tool form and method of manufacturing this new tool. A first cutting face providing a desirable side rake angle with a front wall of the tool is formed in part of a length of bar stock leaving a base portion of rectangular cross-section in the remaining length of the bar stock. A disk shaped grinding wheel which traverses across the bar stock with respect to the bar stock lengthwise direction may be used. A second cutting face also providing a desirable side rake angle with the front wall of the tool is formed as a slot through substantially the full length of the bar stock. The second cutting face may be limited in width to intersect a second flank surface of the tool just below the anticipated depth of cut along the second flank surface. Although a slot is formed through the base portion of the tool, corner sections defined by rectangular mounting surfaces of the base portion are maintained. A disk shaped grinding wheel trimmed to the minimum required second cutting face width and which traverses along substantially the full length of the bar stock may be used. This new tool may include offset or angularly related front cutting faces while maintaining critical sections of a base portion for advantageously locating the tool during manufacture and for rigidly securing the tool in a cutter head during use.

BRIEF DESCRIPTION OF DRAWINGS

FIG. 3 is an isometric view of the cutting tool shown in FIGS. 1 and 2.

FIG. 4 is a top view of the same cutting tool.

FIG. 5 is a cross-section view through the base portion of the same cutting tool.

DETAILED DESCRIPTION OF INVENTION

Figure 1:
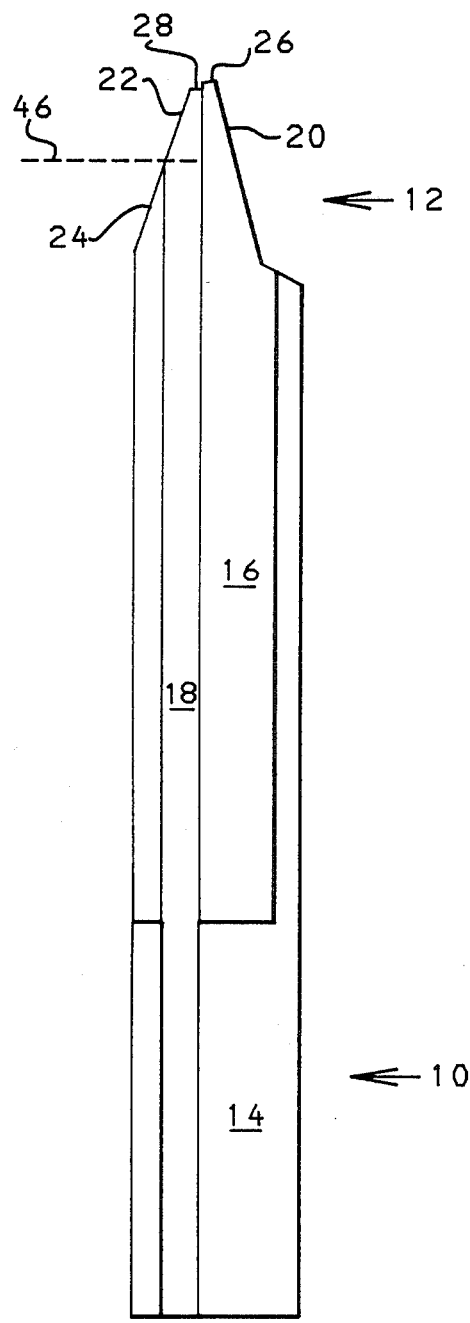
FIG. 1 is a front view of the preferred embodiment of a cutting tool in accordance with the present invention.
Figure 2:
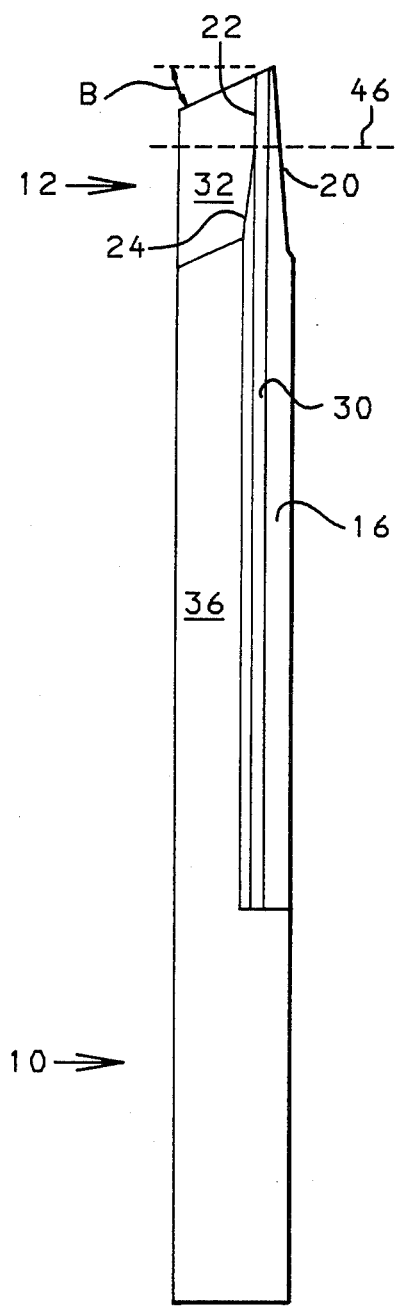
FIG. 2 is a side view of the cutting tool shown in FIG. 1.

The improved cutting tool of the present invention in its preferred embodiment is illustrated by views in FIGS. 1-5. The tool is generally of rectangular cross section and may be formed from a length of bar stock. The tool includes a base portion 10 and a cutting end 12. A first cutting face 16 is formed in front wall 14 at a desired rake angle A. Side finishing cutting edge 20 is formed between first cutting face 16 and flank finishing surface 34. Clearance edge 24 is formed between first cutting face 16 and flank roughing surface 32. A second cutting face 18 is formed within front wall 14 at a second desired rake angle and extends through base portion 10 forming slot 44. Side roughing edge 22 is formed between second cutting face 18 and flank roughing surface 32. Second cutting face 18 is limited in width so that side roughing edge 22 extends only slightly beyond cutting depth 46 which is anticipated for use of the tool. Alternatively, anticipated cutting depth 46 may be understood as slightly above clearance edge 24. Also shown are tool side surfaces 36 and 38, and top surface 40 which is inclined by clearance angle B. Top surface 40 forms with cutting faces 16 and 18 bottom finishing cutting edge 26 and bottom roughing cutting edge 28. In addition, a chip breaking surface 30 is formed between cutting faces 16 and 18. Although not shown, the tool may also include a well known radiused portion between top surface 40 and flank surface 34.

It is important to note that side surfaces 36 and 38, front wall 14 and back wall 42 function as mounting surfaces of the tool. These mounting surfaces, as shown in FIG. 5, form a generally rectangular cross-section outline in base portion 10. Maintenance of this rectangular outline, especially corner sections defined by the mounting surfaces, is particularly important to prevent the tool from twisting with respect to its mounting in a cutter head under the impact of high cutting forces. Slot 44 is shown passing through a mid-part of front wall 14 in base portion 10, thereby avoiding removal of critical corner sections defined by mounting surfaces of the tool.

Although cutting faces 16 and 18 may be offset and angularly related in accordance with the present invention, both faces extend parallel to the lengthwise direction of the tool. Periodically during use, the above identified cutting edges may be renewed simply by regrinding flank surfaces 32 and 34 and top surface 40. In this way, cutting end 12 is advanced along the tool length toward base portion 10 until the usable length of cutting faces 16 and 18 is expired. It is also important to note that since cutting edge renewal is accomplished by reforming only the top and flank surfaces of the tool, metallurgical treatment applied to front cutting faces is preserved throughout the serviceable life of the tool.

Figure 6:
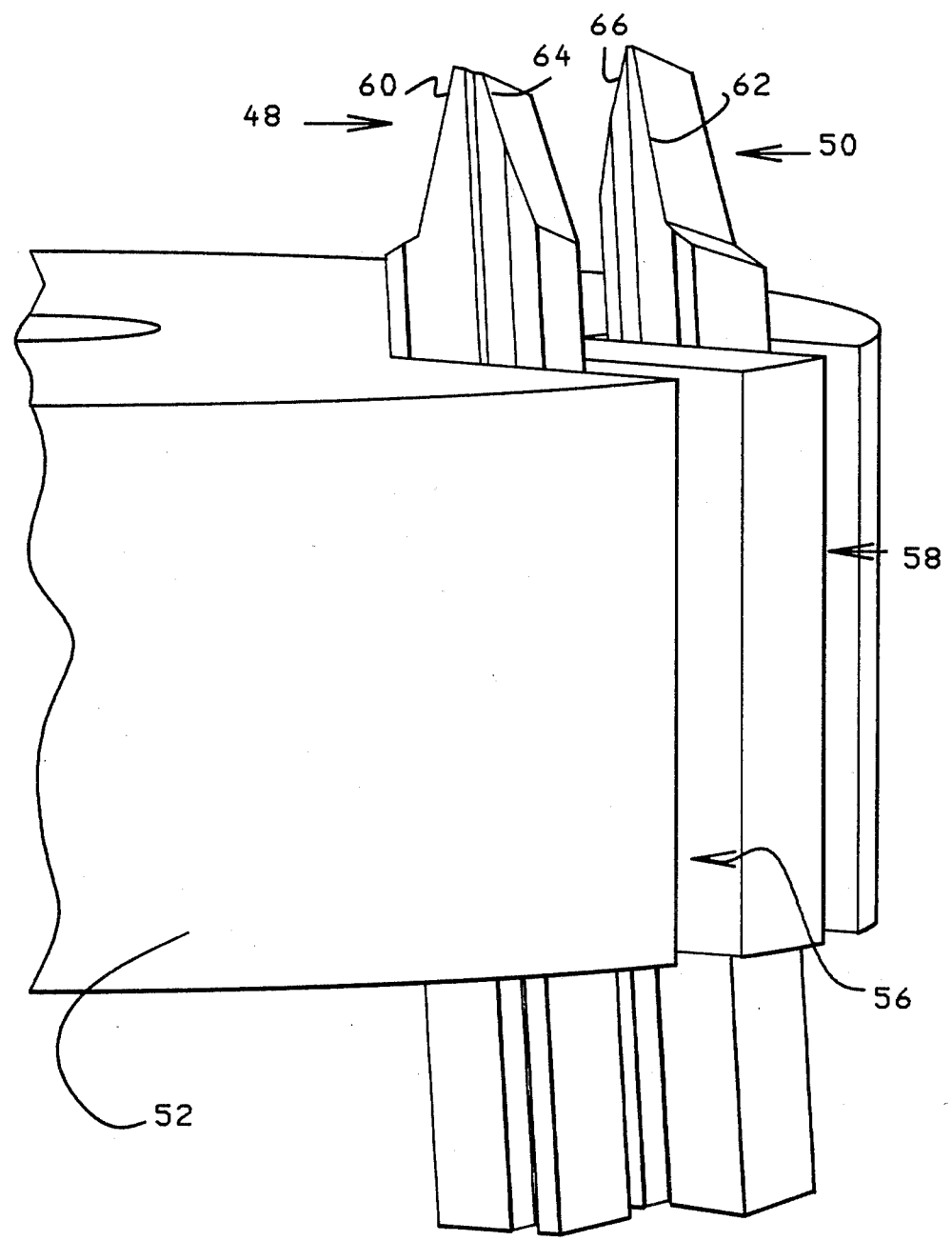
FIG. 6 is an isometric view of a single group of cutting tools in accordance with the present invention mounted schematically in a cutter head.

FIG. 6 illustrates a single group of cutting tools formed in accordance with the present invention, mounted schematically in a cutter head. Although a single tool group is illustrated, in practice, several groups of tools may be employed. Also, in this example a bottom cutting tool is not included within the tool group. Consequently, cutting edges located along both sides and top of these tools are used for cutting. Inside cutting tool 48 is mounted in inside tool slot 56 of cutter head 52. Outside cutting tool 50 is mounted in outside tool slot 58. It may be assumed that cutter head 52 is equipped with suitable tool retaining apparatus that is not shown but well known in the art. Cutting tools 48 and 50 are characterized by inside finishing cutting edge 60 and outside finishing cutting edge 62 respectively. These tools also include respective roughing cutting edges 64 and 66. In use, gear tooth slot surfaces are first rough cut by inside tool 48 and finish cut by outside tool 66. Conversely, other slot surfaces which are rough cut by outside tool 50 are finish cut by inside tool 48. It is also contemplated in the present invention that a single tool may be used to finish cut all surfaces of each tooth slot being formed in a work piece. In addition, ordinary cutting tool modifications necessitated by changes in work piece geometry or material as are commonly practiced in the gear cutting art are intended to be within the scope of the appended claims.

Figure 7:
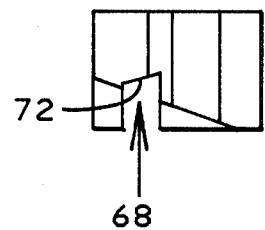
FIG. 7 is a top view of a first alternative embodiment of the cutting tool of the present invention.
Figure 8:
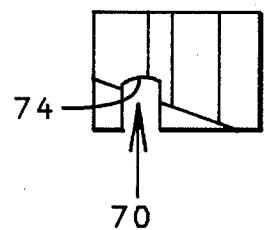
FIG. 8 is a top view of a second alternative embodiment of the cutting tool of the present invention.

FIGS. 7-8 illustrate, in end view, alternative embodiments of the present invention with respect to changes in shape and orientation of compound front cutting faces. With respect to slot 44 of the preferred embodiment, FIG. 7 shows a slot 68 of greater depth having an alternative angularly related second front cutting face 72. FIG. 8 shows slot 70 in which the second front cutting face 74 is formed as a curved surface. Modifications of this type are contemplated to improve cutting performance in response to cutting conditions during use.

In reference to FIGS. 1-5 and in accordance with the present invention, the preferred method of manufacture begins with a predetermined length of bar stock which is cut off at clearance angle B. Side surfaces 36 and 38, flank surfaces 32 and 34, front face 14 and the tool back face (not shown) are rough ground to approximate size. First cutting face 16 is then rough ground into front face 14 of the bar stock at a desired rake angle A for a part of its length thereby preserving base portion 10. The tool is then heat treated to desired hardness. Afterwards, front face 14 and the tool back face 54 are finish lapped to desired size and flatness. Side surfaces 36 and 38 are then finish ground to desired size and squareness. First cutting face 16 is then finish ground in part of the tool length to exact size at desired rake angle A. A disk shaped grinding wheel which traverses across the tool perpendicular with respect to the tool lengthwise direction is used, thereby forming an abrupt junction with base portion 10. Second cutting face 18 is then ground to exact size at a second desired rake angle within front wall 14 and extending the full length of the tool. A disk shaped grinding wheel of a width substantially equal to the desired width of second cutting face 18 is used. This latter mentioned wheel is adapted to traverse along the full length of the tool. Also, more than one tool may be aligned end to end so that in a single pass of the grinding wheel, second cutting faces are formed in a plurality of tools. Flank surfaces 32 and 34 and top surface 40 are then finish ground to desired size and orientation. Lastly, a metallurgical treatment for improving cutting and wear characteristics of the tool may be applied to front cutting faces 16 and 18.

What is claimed is:

1. A gear cutting tool of the type formed from a length of bar stock having a generally rectangular cross-section comprising a first cutting face formed into a front wall portion of the bar stock at a desired rake angle therewith for a part of the length of said cutting tool, said tool including a base portion having rectangular mounting surfaces extending the remaining length of said cutting tool and a cutting end having a first flank surface formed thereon for defining a first cutting edge between said first cutting face and a first side of the tool, and further comprising a second cutting face formed as a slot in said front wall portion of the bar stock at a desired rake angle therewith for substantially the full length of said cutting tool, said cutting end also having a second flank surface formed thereon for defining a second cutting edge between said second cutting face and a second side of the tool.

2. A gear cutting tool as recited in claim 1 wherein said second cutting edge between said second cutting face and said second side of the tool extends less than the full length of said second flank surface.

3. A gear cutting tool as recited in claim 2 wherein said second cutting face is arranged at a greater depth than said first cutting face with respect to said front wall portion of the tool.

4. A gear cutting tool as recited in claim 3 wherein a chip breaking surface is formed between said first and second cutting faces.

5. A gear cutting tool as recited in claim 4 wherein said desired rake angle associated with said first cutting face is arranged at a greater angle than said desired rake angle associated with said second cutting face.

6. A gear cutting tool as recited in claim 4 wherein said tool is adapted for use in a continuous gear cutting operation.

7. A gear cutting tool as recited in claim 4 wherein said cutting end of the tool can be resharpened while preserving said front cutting faces.

8. A gear cutting tool as recited in claim 4 wherein said second cutting face is a curved surface.

9. A gear cutting tool as recited in claim 4 wherein said first cutting edge is used for finish cutting a first portion of a gear tooth slot and said second cutting edge is used for rough cutting a second portion of the same tooth slot.

10. A gear cutting tool as recited in claim 4 wherein said first and second cutting edges are used for finish cutting portions of a gear tooth slot.

11. A method for manufacturing a gear cutting tool of the type formed from a length of bar stock having a generally rectangular cross-section comprising the steps of:

forming a first cutting face in a front wall portion of the bar stock at a desired rake angle therewith for part of the length of the tool;

forming a second cutting face as a slot within said front wall portion of the bar stock at a second desired rake angle therewith for substantially the full length of said cutting tool;

forming a cutting end having first and second flank surfaces thereon for defining first and second cutting edges between said cutting faces and sides of the tool.

12. A method for manufacturing a gear cutting tool as recited in claim 11 wherein said step for forming said first cutting face in a front wall portion of the bar stock is accomplished with a grinding wheel which is adapted to traverse across the tool length and said step for forming said second cutting face as a slot within said front wall portion of the bar stock is accomplished with a grinding wheel which is adapted to traverse along the tool length.

13. A method for manufacturing a gear cutting tool as recited in claim 12 wherein said grinding wheel which is adapted to traverse along the tool length is of a width substantially equal to the width of said second cutting face formed as a slot within said front wall portion of the bar stock.

14. A method for manufacturing a gear cutting tool as recited in claim 13 comprising the further step of:

applying to said front cutting faces a metallurgical or other type of treatment for improving cutting and wear characteristics of the tool.

* * * * *